United States Patent [19]

Lane

[11] Patent Number: 4,836,409

[45] Date of Patent: Jun. 6, 1989

[54] INTEGRAL DIAPHRAGM-LINER BLADDER FOR HYDROPNEUMATIC TANK

[75] Inventor: Joseph A. Lane, Taunton, Mass.

[73] Assignee: Amtrol Inc., West Warwick, R.I.

[21] Appl. No.: 156,974

[22] Filed: Feb. 18, 1988

[51] Int. Cl.⁴ .............................................. F16L 55/00
[52] U.S. Cl. ..................................... 220/403; 138/30; 220/1 B; 220/85 B; 222/386.5
[58] Field of Search ................ 138/30; 220/1 B, 85 B, 220/85 S; 222/94, 95, 386.5

[56] References Cited

U.S. PATENT DOCUMENTS

| | | | |
|---|---|---|---|
| 2,299,611 | 10/1942 | Clark | 220/85 B |
| 2,347,379 | 4/1944 | Teeter | 138/30 |
| 2,378,517 | 8/1943 | Trautman | 138/30 |
| 2,389,792 | 11/1945 | Lippincott | 138/30 |
| 2,480,558 | 4/1949 | DeKiss | 138/30 |
| 2,786,488 | 3/1957 | Mercier | 138/30 |
| 3,046,751 | 7/1962 | Gardner | 220/85 S |
| 3,121,479 | 2/1964 | Dillenburger et al. | 138/30 |
| 3,450,163 | 6/1969 | Mercier et al. | 138/30 |
| 3,722,751 | 3/1973 | Bisciglia | 222/94 |
| 3,830,259 | 8/1974 | Mercier | 138/30 |
| 3,887,104 | 6/1975 | Cole | 220/85 |
| 3,931,834 | 1/1976 | Caillet | 138/30 |
| 4,186,776 | 2/1980 | Burton | 138/30 |
| 4,264,018 | 4/1981 | Warren | 222/95 |
| 4,697,674 | 10/1987 | Tangorra | 188/298 |
| 4,723,577 | 2/1988 | Wursterbarth | 220/85 B |

FOREIGN PATENT DOCUMENTS

| | | |
|---|---|---|
| 0218304 | 4/1987 | European Pat. Off. . |
| 2754606 | 6/1979 | Fed. Rep. of Germany . |
| 0909109 | 10/1962 | United Kingdom . |
| 2111939 | 7/1983 | United Kingdom . |

Primary Examiner—Jimmy G. Foster
Attorney, Agent, or Firm—Fisher, Christen & Sabol

[57] ABSTRACT

A flexible diaphragm/liner located in a tank connected to a liquid system. The bottom opening in the flexible diaphragm/liner is mounted in a hole in the bottom of the tank. The rigid tank is connected to a system to permit materials, like water, etc., to pass into and out of the interior of the flexible diaphragm/liner depending upon the operating needs of the system. The diaphragm/liner has an upper portion which is adapted to flex into or out of its lower portion in a predictable fashion, under pressure changes. A compressible gas is used in the upper portion of the tank.

13 Claims, 2 Drawing Sheets

INTEGRAL DIAPHRAGM-LINER BLADDER FOR HYDROPNEUMATIC TANK

BACKGROUND OF THE INVENTION

1. Field Of The Invention

The invention relates to pressure container assemblies and more specifically to such containers having resilient, deformable bladders therein.

2. Prior Art

Pressure control tanks are well known in the prior art and have been used in water supply systems, hot water heating systems or other water systems for many years. Generally, such tanks provide a small quantity of pressurized water to the system upon demand when the pump is off or, when in hydronic systems, allow for expansion of the water within the system to avoid damage to pipes, valves, boiler, etc.

In its most rudimentary form, such an assembly, commonly referred to as a hydro-pneumatic tank, comprises a tank having connections to the system to allow water to flow into and out of the tank. Air entrapped within the tank is compressed by the rising water level to pressurize the system. However, the large size of such tanks has rendered them impractical for modern applications.

It is known to introduce pressurized air into the tank. This also has drawbacks since some of the air is absorbed by the water and passed into the system. The air in the systems may cause corrosion to develop, the heating of a hot water heating system inconsistent, and generate noise or other deleterious characteristics in the system.

The prior art has often resolved this problem to a large extent by installing a flexible diaphragm in the tank to prevent direct contact between the water and the pressurized air. The periphery of the diaphragm is attached to the interior of the tank and it flexes as the quantity of water in the tank increases or decreases. As with any other element in a system containing water, the life span of the accumulator tank is also limited by the effects of corrosion. Water coming into contact with the metal tank causes rust which eventually contaminates the water system and/or causes the tank to leak. Many prior art tanks have minimized or eliminated the corrosion problem by placing a liquid impervious liner within the tank to prevent contact between the metal tank and the water.

Accumulators in general are chambers wherein incompressible liquid may act upon a compressible medium which maintains the liquid under pressure. Air is preferred to springs as the compressible medium since it is lighter. When air is used, it must be carefully isolated from the liquid since it would dissolve into liquid under pressure and come out of solution when the pressure is relieved, creating troublesome air pockets and bubbles. For this reason a flexible partition is provided between air and liquid. This partition may be in the form of a diaphragm or a bladder.

British Pat. No. 909,109 describes a separation bladder for dividing the interior of the pressure vessel into two separate chambers. The bladder is made of resilient deformable material having its greatest internal diameter in the region adjacent and including the mouth. Note the shapes of the non-stressed bladders in FIGS. 1 to 3.

U.S. Pat. No. 3,931,834 describes an expansion tank diaphragm assembly. The tank is divided into non-communicating chambers by a flexible diaphragm having peripherally outward projecting arms and a side wall engaging protrusion that is held in compression and sealing engagement with the tank walls by a backup ring. The diaphragm appears to have uniform diameter and thickness. Note the shape of unstressed diaphragm 32 and line 22.

West German Offenlegungsschrift No. 2,754,606 describes a diaphragm which divides the interior of a hydropneumatic pressure accumulator into an upper and lower half chambers. The edge of the diaphragm is secured against the inside of the lower housing of the accumulator by means of a holder member. The inner surface of the lower half corresponds to the shape of the diaphragm in the unstretched condition, while that of the upper half is larger than the surface of the unstretched diaphragm when inverted about the holder member.

European Patent Application No. 218,304 describes a bladder type diaphragm fitted in an expansion tank. The shaped diaphragm is held in position by at least one annular open holding element.

U.S. Pat. No. 2,378,517 describes accumulators having a one-piece shell and a bladder for separating a compressible fluid from a relatively incompressible liquid.

See also U.S. Pat. Nos. 3,722,751, 3,887,104, 4,264,108 and 4,697,674 and British Pat. No. 2,111,939.

BROAD DESCRIPTION OF THE INVENTION

An object of the invention is to a provide an integral diaphragm/liner acting as a bladder, placed inside of a tank, i.e., the diaphragm divides the tank into a plurality of chambers and is responsive to the pressure of the tank contents. Another object of the invention is for the liner to protect the steel of the tank from corroding. Another object of the invention is to provide a diaphragm/liner dividing the tank into two halves, the lower position being designed to match the contour of the tank and the upper portion/half having reduced diameter and thickness which allows the upper half to readily fold inside of the lower half. Another object is to provide an integral diaphragm/liner acting as a bladder, and tank containing it which does not have the herein noted prior art disadvantages. A further object is to provide an integral diaphragm/liner which is not held in place by an annular holding element.

The device and apparatus of this invention achieves such and other objects.

Separation of a gas and water in a hydropneumatic tank can be accomplished by use of a bladder or a diaphragm. Such tanks are factory charged with either air or nitrogen, and accept thermally expanded liquids in hydronic systems; liquids between a pump cut-in and cut-out pressure in domestic water systems; and liquids from water hammer in plumbing systems.

In the case of a diaphragm, a mechanical means must be employed to attach the diaphragm to a separate lining or coated tank surface. In such type of design, the only flexing member is the diaphragm, and it is contoured to match the internal surface of the tank to prevent creasing when initially pressurized with air or nitrogen. In the design of bladders where the liquid is inside, the entire bladder surface will move with the adding of air or nitrogen into the tank. When the bladder is pressurized in this manner, detrimental creases, referred to as "checking", will occur that will reduce the flex life of the bladder. When a liquid enters the bladder, there is no control on the shape that the bladder will take making the life expectancy unpredictable.

The invention combines the best features of a diaphragm and liner and having them act like a bladder. Basically the invention device is a diaphragm/liner design, which preferably is divided into two halves. The lower portion has been designed to match the contour of the tank; thus it performs like a liner and has no creases. At the mid-height of the diaphragm/liner, there is a reduction in the diaphragm/liner diameter (D) and thickness transformed by reversing radii which allows the upper half of the diaphragm/liner to gently fold (flex) inside of the lower half, thus, it performs like a diaphragm. Since the upper half has a thinner wall thickness and the lower half conforms to the inner surface contour of the tank when a compressible gas is charged into the tank, only the upper half of the diaphragm/liner flexes in a downward direction. The bottom half remains stationary. When there is no additional movement from the upper half, it matches the contour of the lower half; thus, precluding the formation of creases in the diaphragm/liner. When liquid enters the bladder, only the upper section of the diaphragm/liner moves. Radial pressure keeps the lower portion stationary. The upper portion acts as a diaphragm and flexes in relation to the quantity of liquid entering the tank. As the upper portion of the diaphragm/liner is deflecting upwards, it pivots from the transition section of the upper and lower half similar to a diaphragm pivoting from its fixed locked section. By controlling the bladder motion from a fixed position, the flex life of the diaphragm/liner is increased and predictable.

The following are some of the features and advantages of the invention diaphragm/liner:

The bottom half of the diaphragm/liner is prevented from moving by being more rigid than the upper half section.

The bottom half of the diaphragm/liner acts like a liner preventing tank corrosion.

The bottom half of the diaphragm/liner is prevented from creasing by conforming to the inside contour of the tank.

The upper half of the diaphragm/liner operates as a diaphragm.

The upper half of the diaphragm/liner folds inside of lower half when "factory charged" with a gas.

The upper half of the diaphragm/liner flexes when liquid (water) enters and pivots at the diameter transition section.

The diameter transition section eliminate the need for a mechanical locking device as used with a diaphragm.

In expanding from the inwardly-folded state, the upper half of the diaphragm/liner expands in a non-rolling manner to the fully-expanded state.

The invention diaphragm/liner can be used in pressure control tank (vessel) assemblies for use in liquid flow systems. The tank is preferably cylindrical with elliptical ends.

The tank structure, according to the invention, is preferably of welded construction so as to provide the requisite degree of structural integrity and operational safety. The diaphragm/liner is placed into the tank through the opening in the bottom of the tank and is mounted therein for example, by an attachment which may bolt to the tank via a cover over the opening. A resilient sealing flange is located near the bottom of the diaphragm/liner and extends through the bottom opening in the tank so as to allow the liquid (water) to enter the interior of the diaphragm/liner. Compressed gas (air) is introduced into the tank between the tank wall and the flexible diaphragm/liner.

An important feature of the invention is the construction of the invention diaphragm/liner is that it is designed for a long life and for not having to be replaced for very long periods of time.

The diaphragm/liner of the invention is removable from the tank. The flexible diaphragm/liner is easily replaceable by unfastening its connections to the tank and pulling it through the bottom opening in the tank wall. The removed diaphragm/liner may be either cleaned and replaced, or disposed of, and a new diaphragm/liner installed. The replacement can be easily achieved with minimal disruption of the water system.

BRIEF DESCRIPTION OF THE INVENTION

Figure 1:
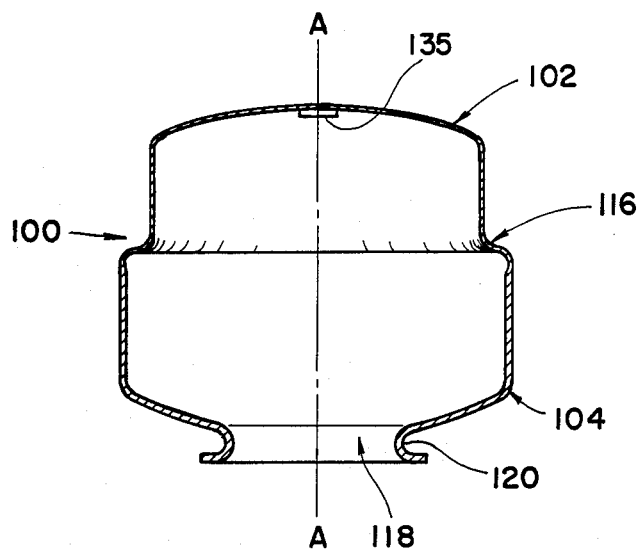
FIG. 1 is a vertical cross-sectional view of the invention diaphragm/liner in its fully expanded state.
Figure 2:
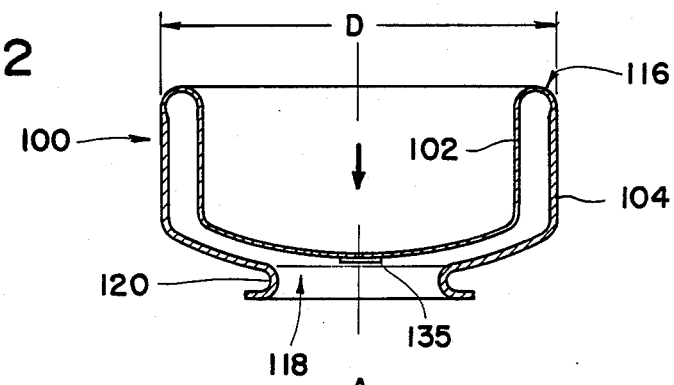
FIG. 2 is a vertical cross-sectional view of the invention diaphragm/liner in its assembled state.
Figure 3:
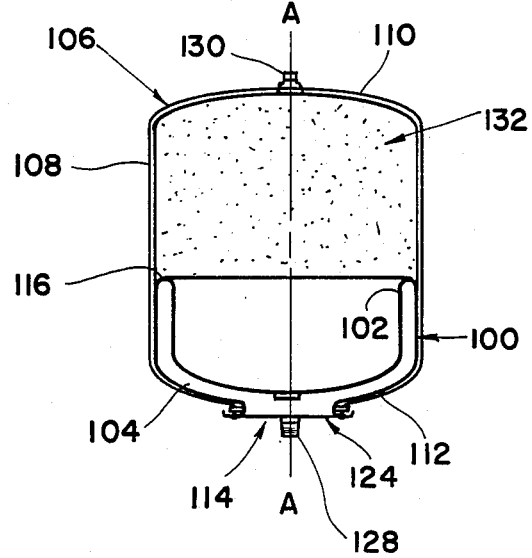
FIG. 3 is a vertical cross-sectional view of the invention diaphragm/liner, in its assemble state, mounted in a tank.

In FIG. 1, diaphragm/liner 100 is constructed of a resilient (non porous) deformable material, such as, butyl rubber (preferred), natural rubber, vinyl polymers and urethane polymers. Diaphragm/liner 100 is divided into two portions (102 and 104), preferably into approximate equal halves. Lower portion 102 of diaphragm/liner 100 is designed to match the contour of the tank. Tank 106 is a container capable of holding and storing pressurized gas and/or liquid. As shown in FIG. 3, rigid tank 106 is preferably one which has a cylindrical upright portion (108) and may include but is not limited to elliptical end portions (110 and 112). Tank 106 is preferably constructed of steel. There is an opening (114) at the bottom of tank 106. The diameter (D) of the diaphragm/liner is that of lower portion 104—see FIG. 2.

Upper portion 102 of diaphragm/liner 100 has a smaller diameter than lower portion 104. At the mid-height (116) of diaphragm/liner 100, there is a transformation region whereby the diaphragm/liner diameter decreases. This diameter reduction is effected by reversing radii (i.e., a lower-positioned inwardly-facing curved region). The thickness of the wall at mid-height region 116 is less than the wall thickness of lower portion 104. Also the wall thickness of upper portion 102 is less than the wall thickness of lower portion 104. Referring to the fully extended position of diaphragm/liner 100 shown in FIG. 1, mid-height section 116 and upper portion 102 easily fold or flex into lower portion 104 as illustrated in FIG. 2.

Figure 5:
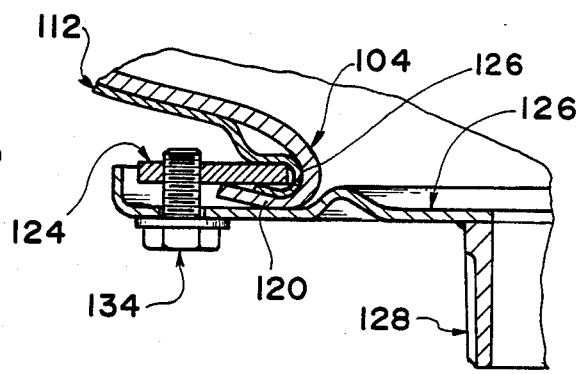
FIG. 5 is an enlarged, partial, vertical cross-sectional view of an embodiment of the diaphragm/liner mounting means.

Diaphragm/liner 100 has opening 118 in bottom portion 104. Reference is made to FIG. 5 wherein the preferred diaphragm/liner mounting means is shown. Other types of diaphragm/liner mounting means can be used. Diaphragm/liner flange 120 is attached to the bottom end of diaphragm/liner 100 such that its opening is coincident with opening 118 through diaphragm/liner 100. Flange 120 is also made of flexible material, such as, butyl rubber (preferably), so that it can be fitted in opening 122 in the bottom of tank 106. Flange 120 is an integral part of diaphragm/liner 100. Tank 106 is connected to a water system (not shown) by known means. Ring flange 124, fits into U-shaped lip portion 126 of tank 106. Blind flange 126 is removable and attached to the bottom of tank 106 by means of bolts 134 (or the like). Bolts 134 fit through rim holes in blind flange 126 and screw into threaded rim holes in ring flange 124. Flange 126 has standard fitting 128 attached thereto. Fitting 128 is also attached to the water system via known piping means (not shown).

Blind flange 124 can be coated with an inert plastic material to prevent corrosion of the flange and contamination of the water coming into contact therewith. Likewise, connecting means 128 can be coated or lined with a corrosion inhibiting substance, such as, copper or provided with nonferrous material.

Bladder flange 120 is part of diaphragm/liner 100. Diaphragm/liner 100 and flange 120 can be formed from any flexible material which is compatible with the fluid with which it is to be used.

Convention air valve 130 is mounted in an opening in the top portion 110 of tank 106 (see FIG. 3). Air valve 130 is connected to a source of pressurized air (not shown) and is used to inject (and remove) pressurized air into the upper region 132 of tank 106 above the upper wall of diaphragm/liner 100.

Two formed domes (110 and 112) are preferably used to form the shape of tank 106. The domes are preferably welded to form tank 106.

Cylindrical center section 108 of tank 106 can also be formed by rolling a flat piece of steel and welding the edges together to form a longitudinal seam. Dome-shaped end pieces 110 and 112 can then be welded on each end. Although these forms of construction are shown for illustrative purposes, any other method of forming tank 106 may be used without exceeding the scope of the invention.

Diaphragm/liner 100 can be formed from a single piece of flexible material or from several pieces bonded or otherwise affixed together by known techniques. A method of forming diaphragm/liner 100 is composed of forming it in halves, or quarters, divided along the length of the diaphragm/liner, and subsequently bonding the edges together. Preferably diaphragm/liner 100 is seamless formed by molding in the shape shown in FIG. 1.

After diaphragm/liner 100 is mounted in tank 106 in the assembled form shown in FIG. 3, pressurized compressible gas 132 (for example, nitrogen or preferably air) is injected into tank 106 via valve 130. Water enters the interior of diaphragm/liner 100 via pipe 128 from the water system when the water pressure therein becomes greater than the tank's air pressure. When liquid enters diaphragm/liner 100, only the upper portion 102 moves. Radial pressure will keep lower portion 104 stationary. Upper portion 102 acts as a diaphragm and flexes in relation to the quantity of liquid entering tank 106. As upper portion 102 is deflected upwards (in a non-rolling manner), it will pivot from the transition section of the upper and lower half similar to a diaphragm pivoting from its fixed locked section. See FIG. 4.

The air pressure in tank 106 forces the water in diaphragm/liner 100 back into the water system when the water pressure therein drops. As the water is forced out (partially or totally, depending upon the overall system pressure equilibrium), upper portion 102 gently folds or flexes into lower portion 104.

Other than the opening for flange 120, there is no need for any other openings in diaphragm/liner 100, particularly top portion 102.

A resilient support (135) is preferably located on the inside surface of upper portion 104 of FIG. 3, resilient support 135 is centrally located (e.g., generally aligned with vertical axis A—A on the inside surface of upper portion 104. Resilient support 135 serves the function of preventing extrusion of upper portion through or into pipe 128 due to gas pressure in upper region 132 of tank 106 and/or to a suction effect from within pipe 128. Resilient support 135 also is of a shape which precludes sealing off entirely the top opening of pipe 128, thus, allowing water to enter initially to upset (force upwards upper portion 104) diaphragm/liner 100.

Figure 6:
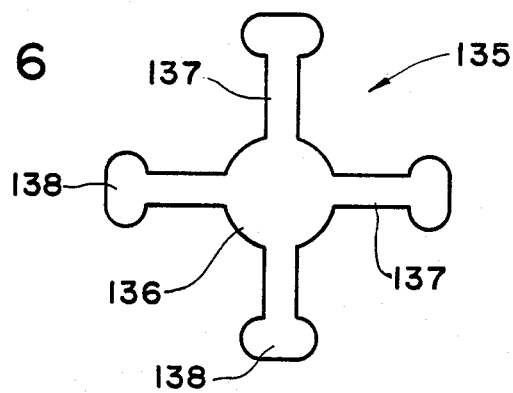
FIG. 6 is a bottom planar view of a diaphragm/liner support of the invention diaphragm/liner shown in FIGS. 1 and 2.

A very preferred resilient diaphragm/liner support 135 is shown in FIG. 6. Support 135 has circular central portion 136, four arms 137 and a knob portion 138 on the end of each arm 137. The bottom surface of support 135, especially central portion 136, is usually flat. Resilient support 135 preferably is integrally molded right into upper portion 104 and composed of the same material as upper portion 104. Central portion 136 has a smaller dimension than the inner dimension of pipe 128 so as to leave passageways between arms 138 when upper portion 104 is in contact with the rim of pipe 128 facing into tank 106.

The tank used in the invention is divided into what amounts to separate chambers by the diaphragm/liner wherein gas under pressure is contained outside of the diaphragm/liner while system water is contained in the diaphragm/liner. The water chamber is connected to the system and changes in pressure are created by the increase and decrease associated with water volume usage in the normal cyclic operation of the system. Connection to the system is provided to permit water to pass into and out of the interior of the flexible diaphragm/liner depending upon the demands placed upon the system. The pressurized air introduced between the exterior of the diaphragm/liner and the interior of the tank, sets up a pressure-volume relationship defined by Boyle's Law.

The following is a discussion of the invention diaphragm/liner and bladder of U.S. Pat. No. 2,378,517. Note the differences of the invention diaphragm/liner and the bladder of Patent '517 when both are fully expanded. The bladder of Patent '517 is substantially spherical when fully expanded (see 18 in FIG. 1 and 50 in FIG. 4). The spherical shape is of no major importance, but the lack of any deviation from a smooth curve at the middle region of the fully-expanded bladder of Patent '517 is significant. This means that the fully-expanded bladder of Patent '517 has a shape which is different than the fully-expanded invention diaphragm/liner. The bladder of Patent '517, when in its non-expanded position, at the middle portion of its vertical side curves and bends inwardly to form an upper portion that has a smaller diameter than the diameter of its lower portion. The lower portion of bladder 50 of Patent '517, when in its expanded position, has a larger internal diameter than the upper portion of bladder 50. In its expanded position, bladder 18 of Patent '517 has equal diameters. There are also significant differences in operation of the bladder of Patent '517 and the diaphragm/liner of the invention.

Middle portion 19 of the bladder of Patent '517 is relatively thin compared to the upper portion of bladder 18. As a result of relatively-thin portion 19, bladder 18 expands in a rolling action downward along the tank wall (which insures that little or no liquid is trapped). See page 2, col. 1, lines 41 to 52, page 2, col. 2, lines 66 to 75, regarding the collapse or telescoping of the bladder of FIG. 4, and page 1, col. 1, lines 16 to 19.

The description of the drawings of Patent '517 only deals with a bladder that is hung from the top of the tank.

Figure 4:
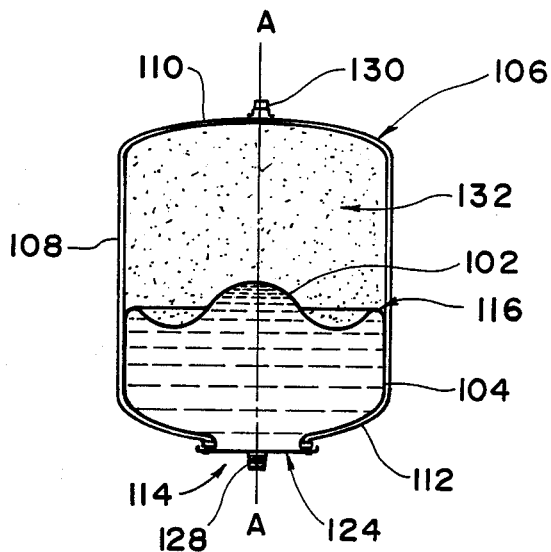
FIG. 4 is a vertical cross-sectional view of the invention diaphragm/liner, in its partially expanded state, mounted in a tank.

The invention diaphragm/liner shows a different mode of operation. The invention diaphragm/liner is mounted in the bottom of the tank. FIG. 4 shows the upper diaphragm/liner segment being flexed by the liquid first pushing up the center. There is a pivoting action at mid-transaction section 106 as the upper diaphragm/liner segment is pushed upward into its fully-expanded position. The result of the expansion apparently does not involve the rolling action described by Patent '517 (with the possible exception of the last stage of expansion of the invention diaphragm/liner).

In the collapse of the bladder of Patent '517 a rolling action is involved.

One of the important results of the rolling action of the bladder of Patent '517 is that the expanding bladder hugs the side of the tank so as to prevent liquid from being trapped between the bladder and the tank. This factor is not present in the top portion of the fully-expanded invention diaphragm/liner. The invention arrangement has liquid in the diaphragm/liner and gas outside of the diaphragm/liner. The drawings of Patent '517 shows just the opposite, but note the broader disclosure of Patent '517.

In Patent '517, claims 1, 2, 7 and 9 require a rolling action by its bladder. The invention diaphragm/liner does not have any openings except the liquid entrance. The metal button of Patent '517 is aligned against the liquid entrance when the tank contains no liquid to prevent the bladder from extruding through the opening. The invention diaphragm/liner preferably has an integral molded-in support (135) to prevent extrusion through the opening (e.g., pipe 128). The shape of the molded-in support (135) of the invention diaphragm/liner precluded sealing off the opening entirely, thus, allowing water to enter initially to upset the diaphragm. Claims 4, 6 and 8 of Patent '517 require metal discs on the bladder. Claim 5 of Patent '517 does not mention any thin portion of its bladder. There is no position requirement for the bladder of claim 10 of Patent '517. claim 10 of Patent '517 does require a tapering in thickness of the bladder wall portion of the free end of the bladder. The specific shape (fully-expanded) and mode of operation of the bladder is not disclosed in claim 10 of Patent '517.

The broad description on page 1 of Patent '517 is nebulous, but is appears to indicate that the bladder is hung from the top of the tank.

Claim 3 of Patent '517 has no express limitation of the position of the bladder in the tank. Also claim 3 of Patent '517 recites the bladder mouth mounted in the liquid entrance of the tank and the use of a bladder having a flexible portion with a thinner wall. The specific shape (fully-expanded) and mode of operation of invention diaphragm/liner is not disclosed in claim 3 of Patent '517.

FIG. 4 of Patent '517 shows bladder 50, which has a spherical shape in its expanded position. Bladder 50 has first portion 52, thick internal rim/transition portion 54 and second portion 56. First portion 52 is thinner than second portion 56. Relatively-thin first portion 52 has a greater internal diameter (near transition portion 54) than does second portion 56 (near transition portion 54) when bladder 50 is in its expanded portion. Second portion 56 orderly collapses or telescopes in a rolling action into first portion 52.

What is claimed is:

1. A diaphragm/liner structure adapted for mounting in a cylindrical tank, comprising a resilient, deformable, integral wall structure having a first cylindrical portion and a section cylindrical portion, the thickness of the first portion being less than the thickness of the second portion the first portion being molded to the second portion by a transition portion, the first portion having an internal diameter which is less than the internal diameter of the second portion even when the diaphragm/liner is in its expanded, but not deformed, position, the diaphragm/liner, when the first portion is folded with the second portion, being adapted to expand under pressure from within whereby the first portion is moved out of the second portion in a non-rolling manner, and the diaphragm/liner, when the first portion is positioned outside of the second portion, being adapted to flex or fold under pressure from without whereby the first portion is moved into the second portion, the second cylindrical portion conforming to the involved internal portion of the cylindrical tank, whereby creases in the second portion are prevented when the inside of the diaphragm/liner is pressurized.

2. The diaphragm/liner of claim 1 wherein the second portion has a port which facilitates the passage of a liquid in and out of the diaphragm/liner.

3. The diaphragm/liner of claim 1 wherein the tank has elliptical ends.

4. The diaphragm/liner of claim 1 wherein there is a resilient molded-in support centrally located on the inside surface of the first portion.

5. The diaphragm/liner of claim 4 wherein the resilient molded-in support has a central portion, four outward extending arms, at 90 degree spacings, and four short cross arms, one on the outwards end of each of outward extending arm.

6. A pressure control tank assembly for use in liquid flow systems, comprising:
    (a) a cylindrical tank having connection means for connection to said flow system and at least one opening through the bottom wall portion thereof; and
    (b) the diaphragm/liner of claim 1 located in the cylindrical tank, the diaphragm/liner having at least one opening in the second cylindrical portion thereof aligned with the connection means such that liquid may flow into and out of the interior of the diaphragm/liner, the second cylindrical portion conforming to the involved internal portion of the cylindrical tank, whereby creases in the second portion are prevented when the inside of the diaphragm/liner is pressurized.

7. The pressure control tank assembly of claim 6 wherein, when the first portion is in its expanded, unstretched position, the transitional portion has a thickness less than the thickness of the second portion and is located in slanted alignment between the adjacent ends of the first portion and second portion.

8. The control tank of claim 6 wherein the second portion has a port which facilitates the passage of a liquid in and out of the diaphragm/liner.

9. The control tank of claim 6 wherein the tank has elliptical ends.

10. The control tank of claim 6 wherein there is a resilient mold-in support centrally located on the inside surface of the first portion, thereby preventing extrusion of the upper portion through said opening in said bottom wall portion of said tank.

11. The pressure control tank assembly of claim 10 wherein the resilient molded-in support has a central portion, four outward extending arms, at 90 degree spacings, and four short cross arms, one on the outwards end of each of outward extending arm.

12. The diaphragm/liner of claim I wherein, when the first portion is in its expanded, unstretched position, the transitional portion has a thickness less than the thickness of the second portion and is located in slanted alignment between the adjacent ends of the first portion and second portion.

13. Method of using the diaphragm/liner of claim 1 to protect the tank wall from corrosion wherein the tank is used in a water flow system.

* * * * *